US012040651B2

(12) United States Patent
Lu et al.

(10) Patent No.: US 12,040,651 B2
(45) Date of Patent: Jul. 16, 2024

(54) ENERGY STORAGE SYSTEM IN THERMAL POWER UNIT COORDINATED FREQUENCY REGULATION CONTROL METHOD

(71) Applicants: Tsinghua University, Beijing (CN); Peking University, Beijing (CN)

(72) Inventors: Chao Lu, Beijing (CN); Xuemei Chen, Beijing (CN); Jie Song, Beijing (CN); Jie Liu, Beijing (CN); Jingtao Wu, Beijing (CN)

(73) Assignees: TSINGHUA UNIVERSITY, Beijing (CN); PEKING UNIVERSITY, Beijing (CN)

( * ) Notice: Subject to any disclaimer, the term of this patent is extended or adjusted under 35 U.S.C. 154(b) by 566 days.

(21) Appl. No.: 17/329,984

(22) Filed: May 25, 2021

(65) Prior Publication Data
US 2021/0367443 A1    Nov. 25, 2021

(30) Foreign Application Priority Data

May 25, 2020    (CN) .......................... 202010446516.4
Jun. 22, 2020    (CN) .......................... 202010576284.4

(51) Int. Cl.
| H02J 7/00 | (2006.01) |
| G05B 17/02 | (2006.01) |
| H02J 15/00 | (2006.01) |

(52) U.S. Cl.
CPC ........ *H02J 7/007182* (2020.01); *G05B 17/02* (2013.01); *H02J 7/0048* (2020.01); *H02J 15/00* (2013.01)

(58) Field of Classification Search
CPC .... H02J 7/007182; H02J 7/0048; H02J 15/00; G05B 17/02
See application file for complete search history.

(56) References Cited

U.S. PATENT DOCUMENTS

| 9,243,519 B2* | 1/2016 | Sweet ................... F01K 23/101 |
| 2007/0132249 A1* | 6/2007 | Andrew .................... F01K 3/00 |
| | | 290/52 |
| 2017/0005470 A1* | 1/2017 | Wagoner ................ G05B 15/02 |
| 2018/0131224 A1* | 5/2018 | Foggia ....................... H02J 7/24 |

* cited by examiner

*Primary Examiner* — Zhipeng Wang
(74) *Attorney, Agent, or Firm* — Hodgson Russ LLP

(57) ABSTRACT

Embodiments of the present disclosure provide an energy storage system in thermal power unit coordinated frequency regulation control method, including: obtaining a status of an combined system of energy storage system and thermal power unit at a certain time point; determining a working period of the combined system according to the status of the combined system; determining a target active power of the combined system according to the working period of the combined system, and determining a target active power of the energy storage system according to the target active power of the combined system in cooperation with an active power of the thermal power unit; and correcting the target active power of the energy storage system according to a power limit and a capacity limit of the energy storage system, to obtain a final active power of the energy storage system.

6 Claims, 2 Drawing Sheets

ENERGY STORAGE SYSTEM IN THERMAL POWER UNIT COORDINATED FREQUENCY REGULATION CONTROL METHOD

CROSS-REFERENCE TO RELATED APPLICATIONS

This application claims priority to Chinese Patent Application No. 202010576284.4, filed Jun. 22, 2020, and Chinese Patent Application No. 202010446516.4, filed May 25, 2020, the entire disclosures of which are incorporated herein by reference.

FIELD

The present disclosure relates to the automatic generation control technology field, and more particularly, to an energy storage system in thermal power unit coordinated frequency regulation control method.

BACKGROUND

Frequency regulation ancillary service mainly refers to a service of adjusting active power of a generator in real time through Automatic Generation Control (AGC) in accordance with a certain regulation rate, to meet automatic response Area Control Error (ACE) requirements. In the related art, the AGC frequency regulation is mainly borne by the thermal power unit. With the increase of new energy penetration ratio, and with the complication of power system frequency characteristics, traditional thermal power unit is conditioned by its own characteristics, and has problems of long response delay, low climbing rate, inaccurate tracking of instructions. Therefore, there is a need to absorb frequency regulation ancillary service effect-oriented high-quality frequency regulation resources.

The energy storage system has become a fast frequency regulation resource of power system because of its advantages such as fast response speed, accurate control and bidirectional regulation. With the maturity of energy storage system technology and the reduction of energy storage system cost, the participation of energy storage system in frequency regulation ancillary service has been carried out widely in the world. The control strategy of energy storage system in existing projects is a complete compensation strategy based on real-time monitoring data. The energy storage system makes up the difference between AGC instruction and actual power of thermal power unit by means of full power active power at fixed time. This control strategy makes the active power of the energy storage system without any directional optimization, which is not conducive to the sustainability of the operating conditions of the energy storage system, nor can it ensure that the frequency regulation performance of the combined system of energy storage system and thermal power unit can meet the requirements of the power system.

SUMMARY

Embodiments of the present disclosure aim to solve at least one of the technical problems in the related art to at least some extent.

For this, embodiments of the present disclosure provide an energy storage system in thermal power unit coordinated frequency regulation control method, including:

obtaining a status of a combined system of energy storage system and thermal power unit at time point t in a frequency regulation procedure i from a distributed control system of thermal power unit and a monitoring system of an energy storage system, wherein the status of the combined system of energy storage system and thermal power unit at the time point t comprises an active power $P_A(t)$ in an AGC frequency regulation instruction, an active power $P_G(t)$ of the thermal power unit, and a charge of state $SOC(t)$ of the energy storage system;

determining whether the charge of state $SOC(t)$ of the energy storage system is in an allowable range of the charge of state;

in response to the charge of state $SOC(t)$ of the energy storage system being in the allowable range, performing operations of:

determining a working period of the combined system of energy storage system and thermal power unit according to the status of the combined system of energy storage system and thermal power unit;

determining a target active power of the combined system of energy storage system and thermal power unit according to the working period of the combined system of energy storage system and thermal power unit, and determining a target active power of the energy storage system according to the target active power of the combined system of energy storage system and thermal power unit in cooperation with an active power of the thermal power unit;

correcting the target active power of the energy storage system according to a power limit and a capacity limit of the energy storage system, to obtain a final active power of the energy storage system; and transferring the final active power to a control unit of the energy storage system, and performing an energy storage system in thermal power unit coordinated frequency regulation control based on the final active power; and in response to charge of state $SOC(t)$ of the energy storage system being outside the allowable range, setting an active power of the energy storage system as $P_B(t)=0$, and sending $P_B(t)=0$ to the control unit of the energy storage system.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

In order to clearly illustrate technical solutions of embodiments of the present disclosure or the related art, a brief description of drawings used in embodiments or the related art is given below. Obviously, the drawings in the following descriptions are only part embodiments of the present disclosure, and for those skilled in the art, other drawings can be obtained according to these drawings without creative labor.

DETAILED DESCRIPTION

Reference will be made clearly and completely to technical solutions in the embodiments of the present disclosure with accompanying drawings. Obviously, the embodiments described here are only part of the embodiments of the present disclosure and are not all embodiments of the present disclosure. Based on the embodiments of the present disclosure, other embodiments obtained by those skilled in the art without creative labor are within scope of the present disclosure.

In order to better understand the present disclosure, application examples of the energy storage system in thermal power unit coordinated frequency regulation control method, which takes into account the assessment of frequency regulation performance, proposed in the present disclosure are described in detail below.

In actual system engineering, the configuration modification of energy storage system in power plant must be carried out on the premise of not affecting the safe operation of the power plant system. Therefore, thermal power units usually continue to respond to AGC instructions in the way of Distributed Control System (DCS) without changing. The energy storage system calculates the active power control instruction of the energy storage system based on a certain control strategy through the detection of AGC instruction, actual power of thermal power unit and the state of the energy storage system, and the energy storage system outputs or absorbs power in response to the control instruction, to respond to the AGC instruction in cooperation with the active power of the thermal power unit.

Figure 1:
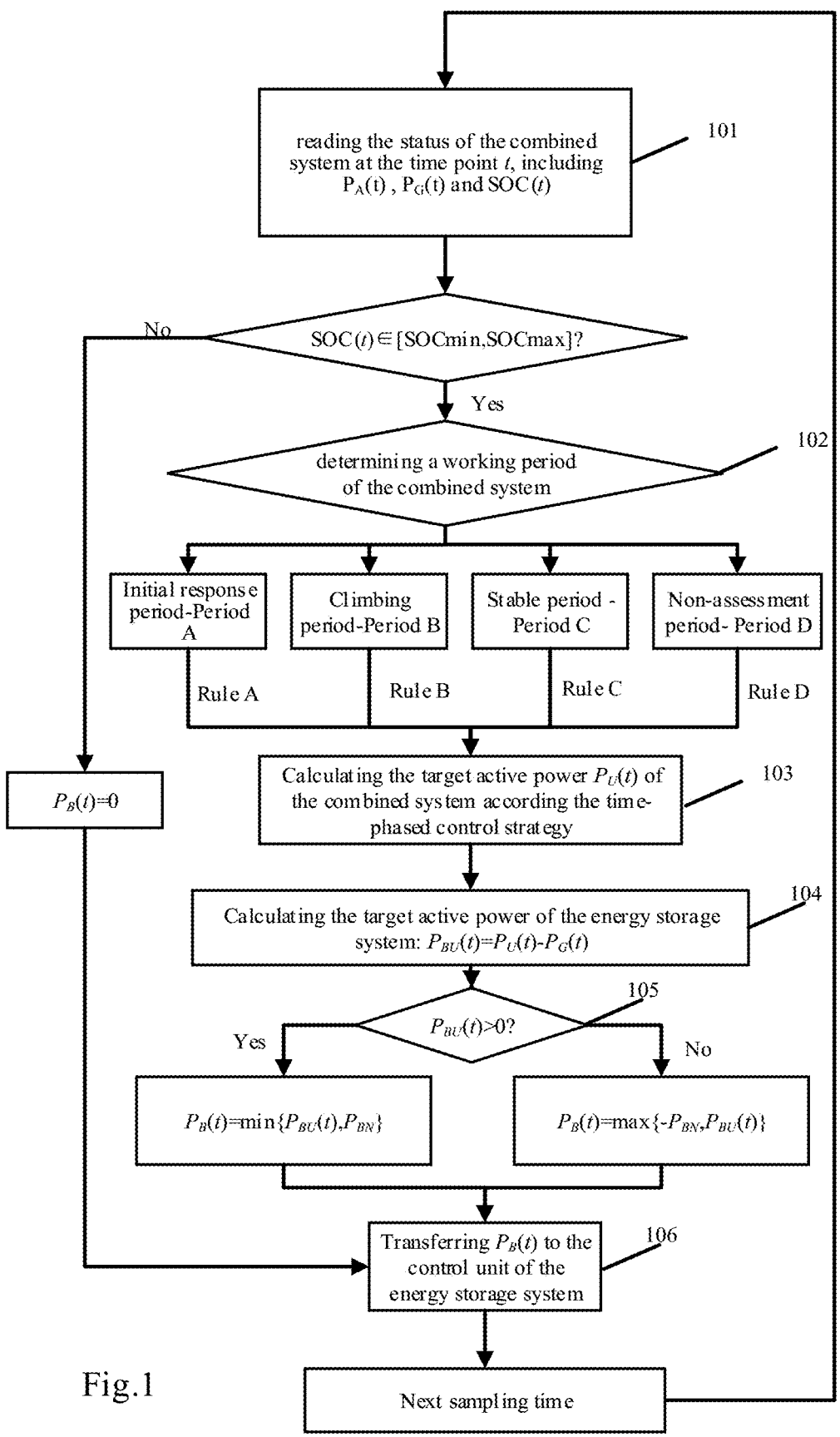
FIG. 1 is a flow chart of an energy storage system in thermal power unit coordinated frequency regulation control method according to an embodiment of the present disclosure.

FIG. 1 is a flow chart of an energy storage system in thermal power unit coordinated frequency regulation control method according to an embodiment of the present disclosure. As illustrated in FIG. 1, the method may include following steps.

At step 101, a status of an combined system of energy storage system and thermal power unit at time point t in a frequency regulation procedure i is obtained from a distributed control system of thermal power unit and a monitoring system of an energy storage system.

The status includes an active power $P_A(t)$ in an AGC frequency regulation instruction, an active power $P_G(t)$ of the thermal power unit, and a charge of state $SOC(t)$ of the energy storage system.

The range where the obtained charge of state $SOC(t)$ of the energy storage system is located is determined. When $SOC(t) \in [SOC_{min}, SOC_{max}]$, step 102 is performed. When the charge of state $SOC(t)$ of the energy storage system is outside the allowable range $[SOC_{min}, SOC_{max}]$, the active power of the energy storage system is set as $P_B(t)=0$, and step 106 is performed. $SOC_{min}$ and $SOC_{max}$ are the minimum value and maximum value of the charge of state of the energy storage system respectively, which are set according to the type of energy storage system and corresponding safety regulations. For the fixed energy storage system, $SOC_{min}$ and $SOC_{max}$ are usually set to certain fixed values.

At step 102, a working period of the combined system of energy storage system and thermal power unit is determined according to the status of the combined system of energy storage system and thermal power unit.

In the assessment and compensation standards of frequency regulation ancillary services, the regulation rate, response time and regulation precision are usually adopted to reflect the performance of the generation unit in response to AGC frequency regulation instructions in different periods, and the comprehensive frequency regulation performance index synthesized by these three sub-indexes is used to reflect the comprehensive performance of the generation unit. For the ith frequency regulation instruction issued by the dispatcher to the power plant, the specific calculation rules of the frequency regulation index in the process of the combined system responding to the AGC frequency regulation instruction are as follows.

Let the regulation rate index when the combined system responds to the AGC frequency regulation instruction is $k_{1i}$, which is calculated by taking the average standard regulation rate $V_{sv}$ (calculated per minute) of the generation unit in the frequency regulation resource distribution area as the quantitative standard, the calculation formula is as follows:

$$k_{1i} = \frac{V_i}{S \times V_{sv}} \quad (1)$$

$$V_i = \frac{|P_g(T_{V1i}) - P_g(T_{V0i})|}{T_{V1i} - T_{V0i}} \quad (2)$$

where, S is the rated capacity of the generation unit; $V_i$ is the actual regulation rate of the combined system; $T_{V0i}$ and $T_{V1i}$ are respectively the initial calculation time point and the termination calculation time point of the climbing stage of the combined system in response to the AGC frequency regulation instruction (the climbing stage is the stage in which the combined system changes with the instruction, which is different from the climbing period described below); $P_g(T_{V0i})$ and $P_g(T_{V1i})$ are respectively the active power states of the combined system corresponding to the initial calculation time point $T_{V0i}$ and the termination calculation time point $T_{V1i}$ in the climbing stage. In general, in order to avoid overregulation or overshoot of the combined system in response to the AGC frequency regulation instructions, the maximum value of $k_{1i}$ does not exceed a certain set value.

Let the response time index of the combined system in response to the AGC frequency regulation instruction is $k_{2i}$, which is calculated based on the allowable delay time Q (in the unit of minute) of the combined system as the quantified standard, the calculation formula is as follows:

$$k_{2i} = 1 - \frac{T_{deli}}{Q} \quad (3)$$

$$T_{deli} = T_{schgi} - T_{starti} \quad (4)$$

where, $T_{deli}$ is the actual response time of the combined system to the ith AGC frequency regulation instruction; $T_{schgi}$ and $T_{starti}$ are respectively the action time point of the combined system in response to the AGC frequency regulation instruction and the issuing time point of the AGC frequency regulation instruction.

Let the regulation precision index of the combined system in response to the AGC frequency regulation instruction as $k_{3i}$, which is calculated with the allowable regulation error A % of the combined system as the quantification standard, the calculation formula is as follows:

$$k_{3i} = 1 - \frac{P_{accui}}{S \times A\ \%} \quad (5)$$

$$P_{accui} = \frac{\int_{T_{acut0i}}^{T_{acut1i}} |P_g(T) - P_A(T)|}{T_{accui}} \quad (6)$$

where, $P_{accui}$ is the actual regulation error of the combined system in response to the AGC frequency regulation instruction, which is the cumulative error between the active power state $P_g(T)$ of the combined system and the active power state $P_A(T)$ of the AGC frequency regulation instruction from the time point $T_{acut0i}$ when the active power of the combined system enters the target dead band to the regulation precision calculation termination time point $T_{acut1i}$.

Let the comprehensive frequency regulation performance index as k, and the comprehensive frequency regulation performance index is used to measure the comprehensive performance of the combined system responding to the AGC frequency regulation instruction within the set assessment period (such as hour, day, month, year, etc.), the calculation formula is as follows:

$$k = 0.25 \times (2k_1 + k_2 + k_3) \quad (7)$$

where, $k_1$, $k_2$ and $k_3$ are the sub-index of the frequency regulation performance of the combined system in the set assessment period, and are the arithmetic mean values of the regulation rate index $k_{1i}$, response time index $k_{2i}$ and regulation precision index $k_{3i}$ respectively in the set assessment period.

The frequency regulation performance index of the combined system reflects different requirements of the frequency regulation of the power system in different periods of frequency regulation. The calculation method of each time node is shown in the table below:

TABLE 1 calculation method of time node

| Time point | Calculation method |
| --- | --- |
| $T_{starti}$ | the time point when the active power state $P_A(t)$ of the AGC frequency regulation instruction changes abruptly |
| $T_{schgi}$ | the time point when the difference between the active power of the combined system and the active power $P_g(T_{starti})$ at the starting time point is greater than the action dead band $P_{sdeadb}$ for the first time and maintains for $U_3$ seconds |
| $T_{V0i}$ | the time point when the difference between the active power of the combined system and the active power $P_g(T_{starti})$ at the starting time point is greater than the set threshold $P_{sd}$ for the first time |
| $T_{V1i}$ | the time point when the combined system completes R % of the AGC frequency regulation instruction |
| $T_{acut0i}$ | the time point when the difference between the active power of the combined system and the active power state $P_A(t)$ of the AGC frequency regulation instruction is less than the target dead band $P_{ddeadb}$ for the first time |
| $T_{acut1i}$ | $T_{acut1i} = T_{acut0i} + T_{accui}$<br>$T_{accui}$ is the calculation duration of the regulation precision, with the maximum accumulated time of $L_3$ seconds |

In Table 1, the action dead band $P_{sdeadb}$, the target dead band $P_{ddeadb}$, $U_3$, $P_{sd}$, R and $L_3$ are all constant values.

Figure 2:
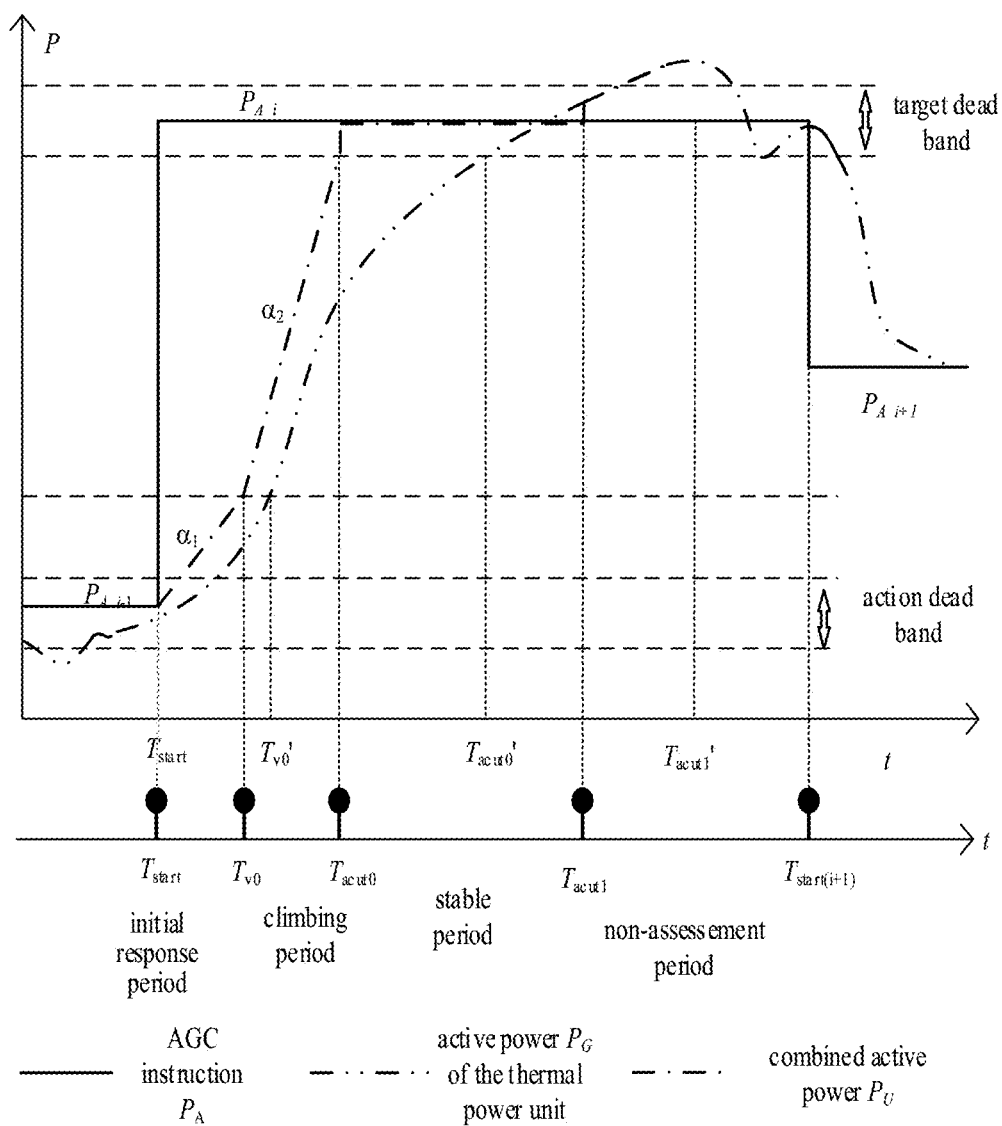
FIG. 2 is a schematic diagram illustrating a division of working periods of a combined system of energy storage system and thermal power unit.

The ith complete AGC frequency regulation process is divided into an initial response period (Period A), a climbing period (Period B), a stable period (Period C) and a non-assessment period (Period D) by the time nodes of instruction issue time point $T_{starti}$, regulation rate calculation starting time point $T_{V0i}$, regulation precision calculation starting time point $T_{acut0i}$ and regulation precision calculation termination time point $T_{acut1i}$. As illustrated in FIG. 2, $T_{V0}'$, $T_{acut0}'$ and $T_{acut1}'$ correspond to the calculation time points of the frequency regulation performance index corresponding to the thermal power unit responding to the AGC frequency regulation instruction alone. $\alpha_1$ and $\alpha_2$ correspond to the climbing rate of active power of the combined system of energy storage system and thermal power unit in the initial response period of Period A and in the climbing period of Period B. $P_{Am}$ (m=i−1,i,i+1) represents the value of the mth AGC instruction sent by dispatching to the power plant.

At step 103, a target active power of the combined system of energy storage system and thermal power unit is obtained according to the working period of the combined system of energy storage system and thermal power unit.

According to the calculation rules of the indexes of the combined system participating in the frequency regulation ancillary service, different measurement standards are adopted for the active power of the combined system in different working periods. Therefore, corresponding to different frequency regulation stages, the target active power $P_U(t)$ of the combined system of energy storage system and thermal power unit is different, which is specifically as follows.

Period A—Rule A: the target active power $P_{U,A}(t)$ of the combined system of energy storage system and thermal power unit is configured in the most economical way, that is, it climbs out of the action dead band $P_{sdeadb}$ at the fastest speed to minimize the response time index $k_{2i}$. Therefore, in order to make the combined system of energy storage system and thermal power unit climb out of the action dead band $P_{sdeadb}$ in the minimum assessment calculation period (usually 1s), the target active power $P_{U,A}(t)$ of the combined system of energy storage system and thermal power unit in this working period should change with the rating of the action dead band, namely the climbing rate during this working period is $\alpha_1 = P_{sdeadb}$.

Period B—Rule B: the target active power $P_{U,B}(t)$ of the combined system of energy storage system and thermal power unit is configured such that, within the limit specified by the regulation rate index $k_{1i}$, it responds to the AGC frequency regulation instruction at the maximum climbing rate, to maximize the regulation rate index $k_{1i}$. Generally, in order to prevent the overshoot or overregulation of the power generation unit, the regulation rate index $k_{1i}$ is set with an upper limit. Therefore, in this working period, the target active power $P_{U,B}(t)$ should be carried out with the maximum limit $V_{max}$ of the climbing rate, that is, the climbing rate in this working period is $\alpha_2 = V_{max}$, in which $V_{max}$ is the regulation rate of the combined system corresponding to the upper limit of the regulation rate index $k_{1i}$.

Period C—Rule C: the target active power $P_{U,C}(t)$ of the combined system of energy storage system and thermal power unit is as close as possible to the AGC frequency regulation instruction value so as to reduce the regulation error and maximize the regulation precision index $k_{3i}$.

Therefore, the combined system of energy storage system and thermal power unit should be fully compensated during this working period, and the target active power $P_{U,C}(t)=P_A(t)$.

Period D—Rule D: for the time point when the calculation of the regulation precision index is terminated and the next AGC frequency regulation instruction has not arrived, it belongs to the stage where the calculation of AGC frequency regulation performance is not assessed. The target active power $P_{U,D}(t)$ of the combined system of energy storage system and thermal power unit at this stage is to make the charge of state SOC(t) of the energy storage system return to the intermediate state as far as possible, in order to better respond to the next AGC frequency regulation instruction. Specifically, the upper and lower limits of the median of SOC(t) of the energy storage system are set as $S_{Smax}$ and $S_{Smin}$ respectively. If the SOC(t) of the energy storage system $\in [S_{Smin}, SOC_{max}]$, and $P_A(t) > P_G(t)$, then let $P_{U,D}(t)=P_A(t)$, and the energy storage system discharges. If the SOC (t)$\in [SOC_{min}, S_{Smin}]$ and $P_A(t) < P_G(t)$, then let $P_{U,D}(t)=P_A(t)$, and the energy storage system is charged. In other cases, let $P_{U,D}=P_G(t)$, and the energy storage system does not operate.

At step 104, a target active power of the energy storage system is determined according to the target active power of the combined system of energy storage system and thermal power unit in cooperation with an active power of the thermal power unit.

The target active power $P_{BU}(t)$ of the energy storage system is obtained by removing the active power part of the thermal power unit from the target active power of the combined system of energy storage system and thermal power unit obtained with the time-phased control strategy, that is, $P_{BU}(t)=P_U(t)-P_G(t)$.

At step 105, the target active power of the energy storage system is corrected according to a power limit and a capacity limit of the energy storage system, to obtain a final active power $P_B(t)$ of the energy storage system.

From the point of view of safety and stability, when controlling the active power of the energy storage system, the working state of the energy storage system should be considered comprehensively, and the target active power of the energy storage system should be corrected to obtain the final control instruction of the energy storage system. Considering the capacity limit of the energy storage system, when the SOC(t) of the energy storage system is outside $[SOC_{min}, SOC_{max}]$, the energy storage system is unable to respond to the control instruction. At this time, the active power of the energy storage system is $P_B(t)=0$. When the SOC(t) of the energy storage system $\in [SOC_{min}, SOC_{max}]$, considering the power limit, the active power $P_B(t)$ of the energy storage system cannot exceed the rated power $P_{BN}$ of the energy storage system. The active power $P_B(t)$ of the energy storage system is calculated according to the following formula:

$$P_B(t) = \begin{cases} \min(P_{BU}(t), P_{BN}) & P_{BU}(t) > 0 \\ \max(-P_{BN}, P_{BU}(t)) & P_{BU}(t) < 0 \end{cases} \quad (8)$$

At step 106, the obtained active power $P_B(t)$ of the energy storage system is transferred to the control unit of the energy storage system. When the next sampling time comes, step 101 is returned to and the above process is repeated to complete the energy storage system in thermal power unit coordinated frequency regulation control.

The present disclosure provides an energy storage system in thermal power unit coordinated frequency regulation control method considering the assessment of the frequency regulation performance. This method is a kind of time-phased control strategy for the energy storage system considering the assessment of the frequency regulation performance, which by reasonably controlling the action time and action depth of the energy storage system, improves the efficiency of the energy storage system and the frequency regulation performance of the combined system, thereby increasing benefits of power plants participating in frequency regulation ancillary services.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. An energy storage system in thermal power unit coordinated frequency regulation control method, comprising:
    obtaining a status of an combined system of energy storage system and thermal power unit at time point t in a frequency regulation procedure i from a distributed control system of thermal power unit and a monitoring system of an energy storage system, wherein the status of the combined system of energy storage system and thermal power unit at the time point t comprises an active power $P_A(t)$ in an automatic generation control (AGC) frequency regulation instruction, an active power $P_G(t)$ of the thermal power unit, and a charge of state SOC(t) of the energy storage system;
    determining whether the charge of state SOC(t) of the energy storage system is in an allowable range of the charge of state;
    in response to the charge of state SOC(t) of the energy storage system being in the allowable range, performing operations of:
        determining a working period of the combined system of energy storage system and thermal power unit according to the status of the combined system of energy storage system and thermal power unit;
        determining a target active power of the combined system of energy storage system and thermal power unit according to the working period of the combined system of energy storage system and thermal power unit, and determining a target active power of the energy storage system according to the target active power of the combined system of energy storage system and thermal power unit in cooperation with the active power $P_G(t)$ of the thermal power unit;
        correcting the target active power of the energy storage system according to a power limit and a capacity limit of the energy storage system, to obtain a final active power of the energy storage system; and
        transferring the final active power to a control unit of the energy storage system, and performing an energy storage system in thermal power unit coordinated frequency regulation control based on the final active power; and
    in response to charge of state SOC(t) of the energy storage system being outside the allowable range, setting an active power $P_B(t)$ of the energy storage system as $P_B(t)=0$, and sending $P_B(t)=0$ to the control unit of the energy storage system.

2. The method of claim 1, wherein the frequency regulation procedure of the combined system of energy storage system and thermal power unit comprises four working periods of an initial response period, a climbing period, a stable period and a non-assessment period.

3. The method of claim 2, wherein the initial response period is from $T_{starti}$ to $T_{v0i}$, the climbing period is from $T_{v0i}$ to $T_{acut0i}$, the stable period is from $T_{acut0i}$ to $T_{acut1i}$, and the non-assessing period is from $T_{acut1i}$ to $T_{start(i+1)}$, where $T_{starti}$ is a time point when the active power $P_A(t)$ of the AGC frequency regulation instruction changes abruptly, $T_{v0i}$ is a time point when a difference between the active power $P_A(t)$ of the AGC frequency regulation instruction and an active power at $T_{starti}$ is greater than a preset threshold for the first time, $T_{acut0i}$ is a time point when a difference between the active power of the combined system and the active power state of the AGC frequency regulation instruction is less than a target dead band for the first time, $T_{acut1i} = T_{acut0i} + T_{accui}$, in which $T_{accui}$ is a calculation duration of a regulation precision.

4. The method of claim 2, wherein the target active power of the combined system of energy storage system and thermal power unit in the initial response period is configured as climbing out of the action dead band at the fastest speed to minimize a response time index of the combined system of energy storage system and thermal power unit;

the target active power of the combined system of energy storage system and thermal power unit in the climbing period is configured such that, within the limit specified by a regulation rate index of the combined system, it responds to the AGC frequency regulation instruction at a maximum climbing rate, to maximize the regulation rate index;

the target active power of the combined system of energy storage system and thermal power unit in the stable period is configured as close as possible to the AGC frequency regulation instruction value so as to reduce a regulation error and maximize the regulation precision index; and the target active power of the combined system of energy storage system and thermal power unit in the non-assessment period is configured to make the charge of state SOC(t) of the energy storage system return to an intermediate state as far as possible.

5. The method of claim 1, wherein the target active power of the energy storage system is obtained by removing an active power part of the thermal power unit from the target active power of the combined system of energy storage system and thermal power unit.

6. The method of claim 1, wherein correcting the target active power of the energy storage system comprises:

determining whether the charge of state SOC(t) of the energy storage system is within [$SOC_{min}$, $SOC_{max}$];

in response to the charge of state SOC(t) of the energy storage system being outside [$SOC_{min}$, $SOC_{max}$], setting the final active power of the energy storage system to zero; and in response to the charge of state SOC(t) of the energy storage system being within [$SOC_{min}$, $SOC_{max}$], calculating the final active power of the energy storage system according to a formula of $$P_B(t) = \begin{cases} \min(P_{BU}(t), P_{BN}) & P_{BU}(t) > 0 \\ \max(-P_{BN}, P_{BU}(t)) & P_{BU}(t) < 0 \end{cases}$$

where, $P_{BU}(t)$ is the target active power of the energy storage system, $P_B(t)$ is the final active power of the energy storage system, $P_{BN}$ is a rated power of the energy storage system.

* * * * *